United States Patent [19]

Sartorio et al.

[11] Patent Number: 5,015,821
[45] Date of Patent: May 14, 1991

[54] COMPUTER CONTROLLED WELDING ROBOT

[75] Inventors: Franco Sartorio; Gianfranco Carbonato, both of Turin, Italy

[73] Assignee: Amada Company, Limited, Japan

[21] Appl. No.: 310,192

[22] Filed: Feb. 14, 1989

[30] Foreign Application Priority Data

Feb. 15, 1988 [IT] Italy ............................. 67106 A/88
Feb. 15, 1988 [IT] Italy ............................. 67107 A/88

[51] Int. Cl.⁵ ............................................. B23K 9/127
[52] U.S. Cl. .................................. 219/124.34; 901/42
[58] Field of Search .................. 219/125.1, 124.34; 901/42

[56] References Cited

U.S. PATENT DOCUMENTS

| | | | |
|---|---|---|---|
| 4,323,758 | 4/1982 | Vokurka | 219/125.1 |
| 4,417,127 | 11/1983 | Nachev et al. | 219/124.34 |
| 4,599,506 | 7/1986 | Burke et al. | 219/124.34 |
| 4,629,860 | 12/1986 | Lindbom | 219/125.1 |
| 4,642,752 | 2/1987 | Debarbieri et al. | 219/124.34 |
| 4,675,502 | 6/1987 | Haefner et al. | 219/124.34 |
| 4,831,232 | 5/1989 | Andersson et al. | 219/124.34 |

FOREIGN PATENT DOCUMENTS

| | | |
|---|---|---|
| 109068 | 11/1983 | European Pat. Off. . |
| 266070 | 10/1987 | European Pat. Off. . |
| 1511609 | 5/1978 | United Kingdom . |
| 2099183 | 12/1982 | United Kingdom . |

Primary Examiner—Clifford C. Shaw
Attorney, Agent, or Firm—Wigman & Cohen

[57] ABSTRACT

A welding robot for performing welding on a workpiece has a base frame, an arm mounted on the base frame, a welding torch freely rotatable around at least one axis of a tip section of the arm, and a detector on the tip section of the arm, the detector being rotatable about the axis of the welding torch. The robot has a controller which controls the movement of the arm with respect to the base frame. The controller includes an arrangement for comparing the position of the welding torch detected by the detector with a desired position preprogrammed independenlty of prior robot movement.

15 Claims, 12 Drawing Sheets

COMPUTER CONTROLLED WELDING ROBOT

BACKGROUND OF THE INVENTION

1. Field of the Invention

The present invention relates to an welding robot, and, in particular, to an welding robot capable of freely welding workpieces of many different shapes, under a wide variety of conditions by the movement within a specified operating area of a head on which a welding torch is mounted.

2. Description of the Prior Art

Conventionally, welding robots capable of welding workpieces of many different shapes, under a wide variety of conditions by the movement within a specified operating area of a head on which a welding torch is mounted are known. The movement of the head and the like of this type of welding robot is usually carried out under the control of a control device such as a computer or the like. Accordingly, it is necessary to create a specific program corresponding to the act of the movement to cause the head to move with a specified positioning precision (for example, with an error of less than 0.1 mm) based on a specified welding cycle.

However, in a conventional welding robot, because the head is caused to move merely by inputting the program even though the structure required to cause the head and the various parts of the head to move is very complicated, it is difficult to accurately position the head over the workpiece. Accordingly, it is difficult to draw up the required program working at a desk. Usually, the welding robot is caused to learn the operation at the actual workpiece, for example, by all types of 'teaching' operations. Accordingly, this gives rise to the problem to waste time for works other than the welding, and the operating efficiency drops. In addition, it becomes impossible to draw up an operating program on a computer with the assistance of CAD-CAM or the like, and drawing up a welding program for a workpiece with a complicated shape becomes very difficult.

SUMMARY OF THE INVENTION

An object of the present invention is to provide, with due consideration to the drawbacks of such conventional devices, an welding robot for which it is easy to draw up, in a location other than the actual work site, a program for accurately operating the robot.

This object is achieved in the present invention by the provision of a first invention of a welding robot comprising a base frame; an arm means mounted on the base frame and provided with a tip section which is freely movable within a specified area in relation to the base frame; a welding torch provided in a freely rotatable manner around at least one axis on the tip section of the arm means; a detection means provided on the tip section of the arm means, for detecting the relative position of the welding torch with respect to the workpiece; and a control means capable of controlling the movement of the arm means with respect to the base frame and of controlling the rotation of the welding torch with respect to the tip section of the arm means based on a signal from the detection means.

In addition, there is provided a second invention of a welding robot comprising a base frame; an arm means mounted on the base frame and provided with a tip section which is freely movable within a specified area in relation to the base frame; a welding torch provided in a freely rotatable manner around at least one axis on the tip section of the arm means; a detection means provided on the tip section of the arm means in a freely rotatable manner around an axis which intersects the rotation axis of the welding torch, and is capable of detecting the relative position of the welding torch with respect to the workpiece; and a control means capable of controlling the movement of the arm means with respect to the base frame and of controlling the rotation of the welding torch with respect to the tip section of the arm means based on a signal from the detection means.

Also there is provided a third invention of a welding robot comprising a base frame; an arm means mounted on the base frame and provided with a tip section which is freely movable within a specified area in relation to the base frame; a welding torch provided on the tip section of the arm means in a freely rotatable manner around at least two axis which mutually intersect; and a control means capable of controlling the movement of the arm means with respect to the base frame and of controlling the rotation of the welding torch with respect to the tip section of the arm means.

As a result of the configuration of the first invention, the welding torch is activated by a signal from the detection means so that the welding torch can easily be positioned relative to the workpiece, and the program for controlling the action of the welding torch can easily be drawn up working at a desk.

In addition, as a result of the configuration of the second or third invention, when the rotation of the welding torch or the detection means is being performed, it is possible to independently control the mutual rotation centered around the mutually intersecting shafts, the control program can be simplified so that it is possible to draw it up while working at a desk.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Figure 1:
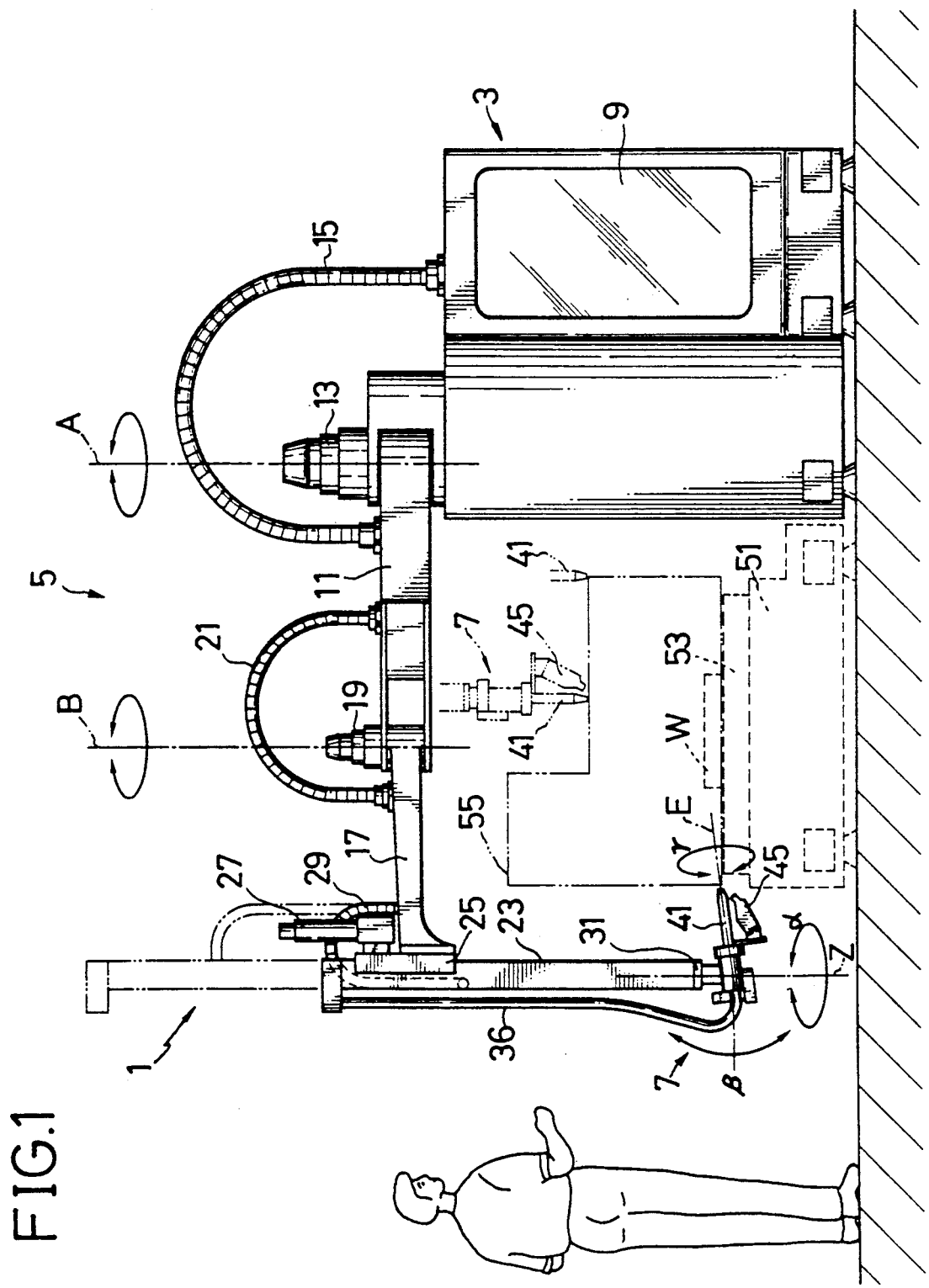
FIG. 1 is a side elevation as an explanatory drawing of a first embodiment of the welding robot of the present invention.
Figure 2:
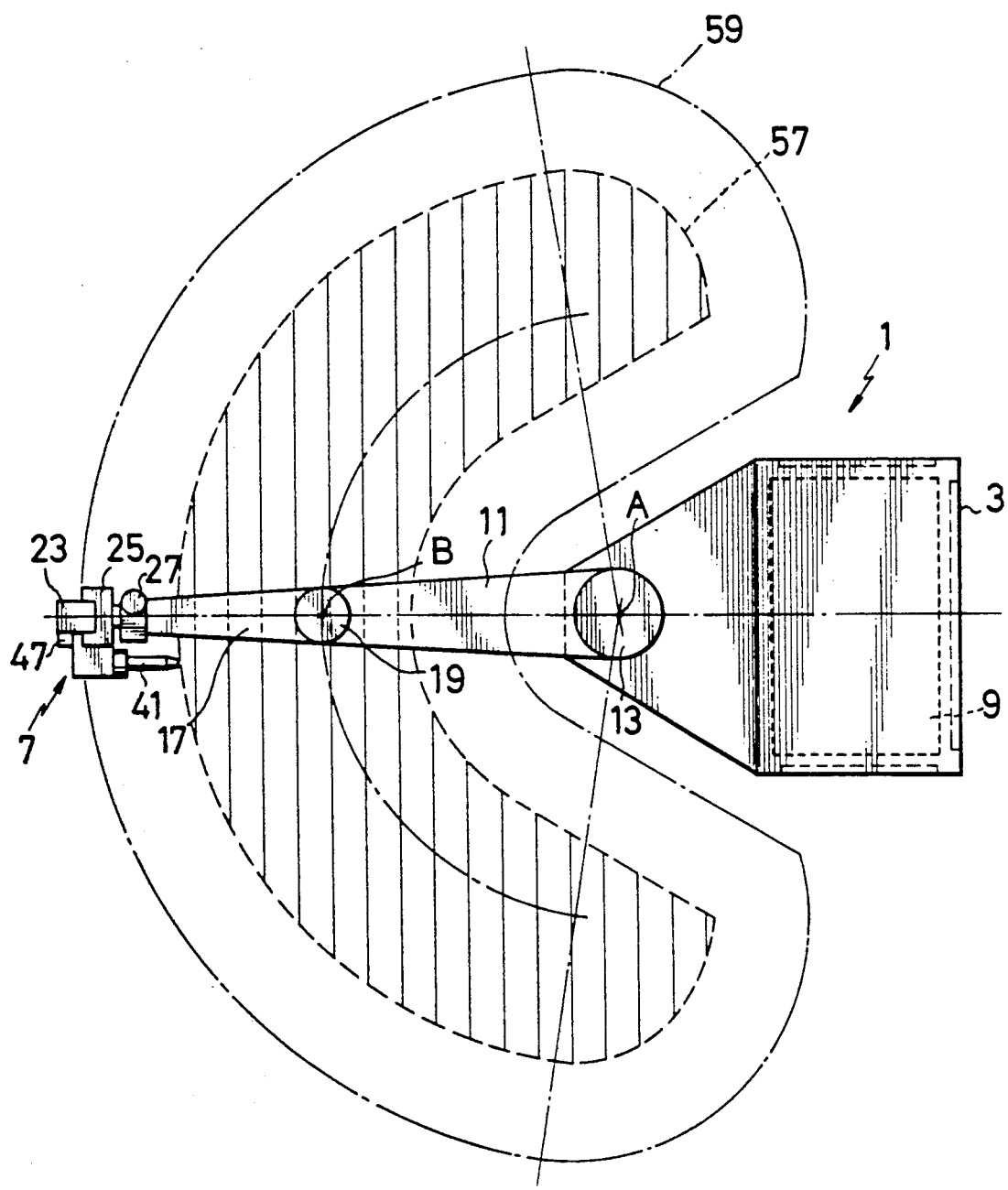
FIG. 2 is a plan drawing as an explanatory drawing of the first embodiment.

Now referring to FIG. 1 and FIG. 2, an welding robot 1 of the present invention, which is mainly employed for welding work performed without the use of welding material, such as TIG welding, comprises a base frame 3, an arm means 5 of which base edge section is supported in a freely rotatable manner on the base frame 3, and a head section 7 supported on the tip section of the arms means.

The base frame 3 is provided with, for example, a cabinet structure which incorporates a control device 9 in its inner section as a control means for control the entire action of the welding robot 1.

On the base frame 3, a base edge section of a first horizontal arm 11 which acts as a first element of the arm means 5, is supported in a freely rotatable manner around a perpendicular shaft A by means of a manipulator device 13. The manipulator device 13 is provided with an actuator (omitted from the drawings) for causing the first horizontal arm 11 to rotate in the forward and reverse directions, around the shaft A, and an angle sensor (omitted from the drawings) for detecting the angle of rotation of the first horizontal arm 11 are built into the manipulator device 13. The first horizontal arm 11 is connected to the base frame 3 by a connecting cord 15 which can transmit various types of signals, energy, and the like.

Accordingly, the drive of the manipulator device 13 is controlled by a signal from the control device 9, and the first horizontal arm 11 is moved, for example, at an angular velocity of 45 degrees per second within an angular range of 160 degrees around the axis A.

On the tip section of the first horizontal arm 11, a base edge section of the second horizontal arm 17 as a second element of the arm means 5, is provided in a freely rotatable manner around a perpendicular shaft B through a second manipulator device 19, the same as the manipulator device 13. The second horizontal arm 17 is connected to the first horizontal arm 11 by a connecting cord 21 the same as the connecting cord 15.

Accordingly, the drive of the manipulator device 19 is controlled by a signal from the control device 9, and the second horizontal arm 17 is moved, for example, at an angular velocity of 105 degrees per second within an angular range of 320 degrees around the axis B.

On the tip section of the second horizontal arm 17, a column-shaped arm 23 as a third element of the arm means 5, is provided in a freely elevatable manner through a guide device 25 and a third manipulator device 27. The guide device 25 has a C-shaped cross section and supports the body section of the column-shaped arm 23 from three sides, as clearly showing in FIG. 2. In addition, the third manipulator device 27 is provided with a suitable actuator (omitted from the drawings) for elevating the column-shaped arm 23, and is also provided with a position sensor (also omitted from the drawings) for detecting the elevation movement of the arm 23.

Also, the arm 23 is electrically connected to the second horizontal arm 17 by a connecting cord 29.

Accordingly, the drive of the third manipulator device 27 is controlled by a control signal from the control device 9, and the column-shaped arm 23 is elevated, for example, at a velocity of 0.8 meters per second in a linear range of 850 mm.

The head section 7 is provided on the lower edge section of the column-shaped arm 23.

Figure 3:
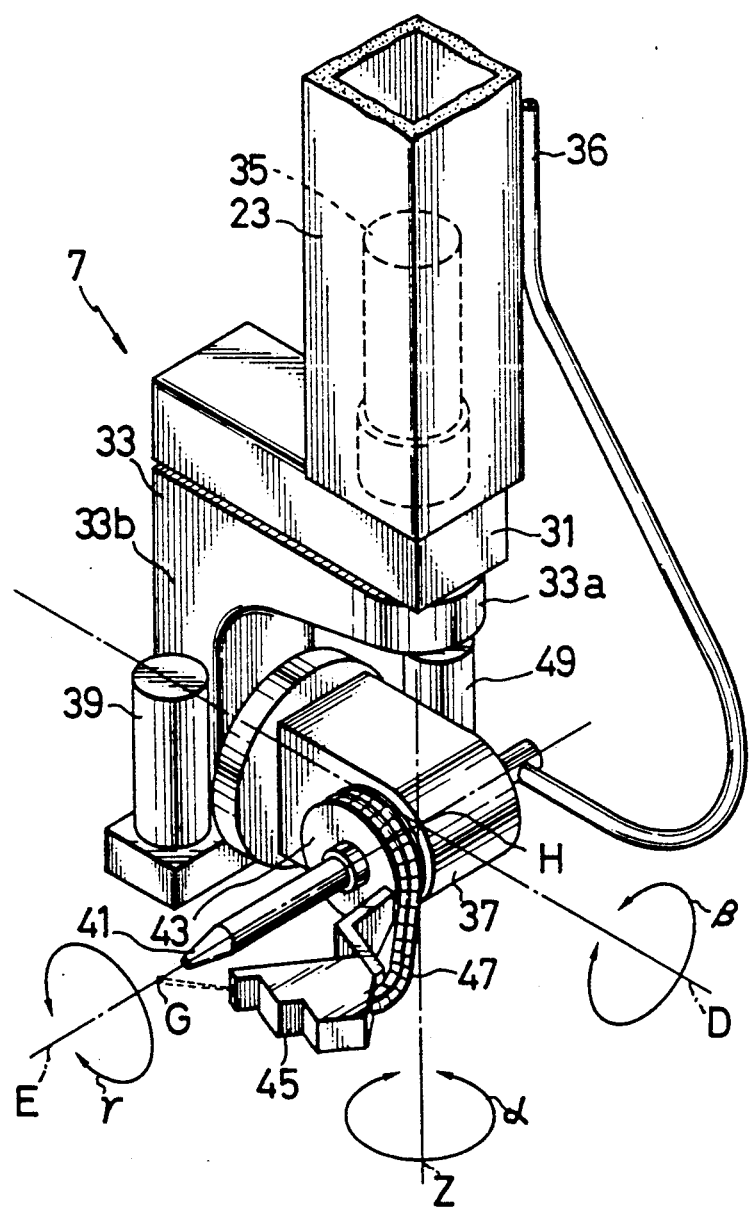
FIG. 3 is a perspective drawing of the head section of the first embodiment.

Specifically, as shown in FIG. 3, an auxiliary block 31 is provided on the lower edge section of the column-shaped arm 23. On the auxiliary block 31, a horizontal section 33a of an inverted L-shaped block 33 is supported in a manner to be freely rotatable around a vertical axis Z which passes through the shaft centerline of the arm 23. In addition, a fourth manipulator device 35 is provided on the section of the arm 23 for rotating the inverted L-shaped block 33 around the vertical axis Z and detecting the rotary position of the block 33. The head section 7 is connected to the arm 23 through a connecting cord 36.

Accordingly, the drive of the fourth manipulator device 35 is controlled by a signal from the control device 9, and the inverted L-shaped block 33 is rotated, for example, at an angular velocity of 300 degrees per second around the vertical shaft Z, within an angula range of 360 degrees (this angle is shown as alpha).

A rod-shaped block 37 is supported on the vertical section 33b of the inverted L-shaped block 33 in a manner freely rotatable around a horizontal axis D which is parallel to the longitudinal direction of the horizontal section 33a and at right angles to the vertical axis Z.

Further, a fifth manipulator means 39 for rotating the rod-shaped block 37 around the horizontal axis D and detecting the rotation of the horizontal block 37 therearound, is provided on the lower edge section of the vertical section 33b of the inverted L-shaped block 33. Accordingly, the drive of the fifth manipulator device 39 is controlled by a signal from the control device 9, and the rod-shaped block 37 is rotated, for example, at an angular velocity of 300 degrees per second around the vertical shaft Z, within an angular range of 240 degrees (this angle is shown as beta).

In the vicinity of the tip section of the rod-shaped block 37, a welding torch 41 such as a welding rod in an electeic welding, is fitted in a manner freely rotatable around a horizontal axis E so that it pierces the rod-shaped block 37. In this embodiment of the present invention, the horizontal axis E intersects the common point H of the vertical axis Z and the horizontal axis D.

A laser-type visual sensor 45 which can monitor the welding region G of the welding torch 41 is installed on a disc member 43 which is provided on the welding torch 41. The sensor 45 has, for example, a field of vision of 5 mm×5 mm. The sensor 45 is electrically connected to the head 7 by a cable 47. On the rear surface of the rod-shaped block 37, there is provided a sixth manipulator device 49 for rotating the welding torch 41 and the visual sensor 45 around the horizontal axis E and detecting this angle of rotation.

Accordingly, the drive of the sixth manipulator device 49 is suitably controlled by a signal from the control device 9, and the welding torch 41 and the laser type visual sensor 45 can be rotated, for example, at an angular velocity of 450 degrees per second within an angular range of 360 degrees around the horizontal shaft E (this angle is shown as gamma).

Figure 4:
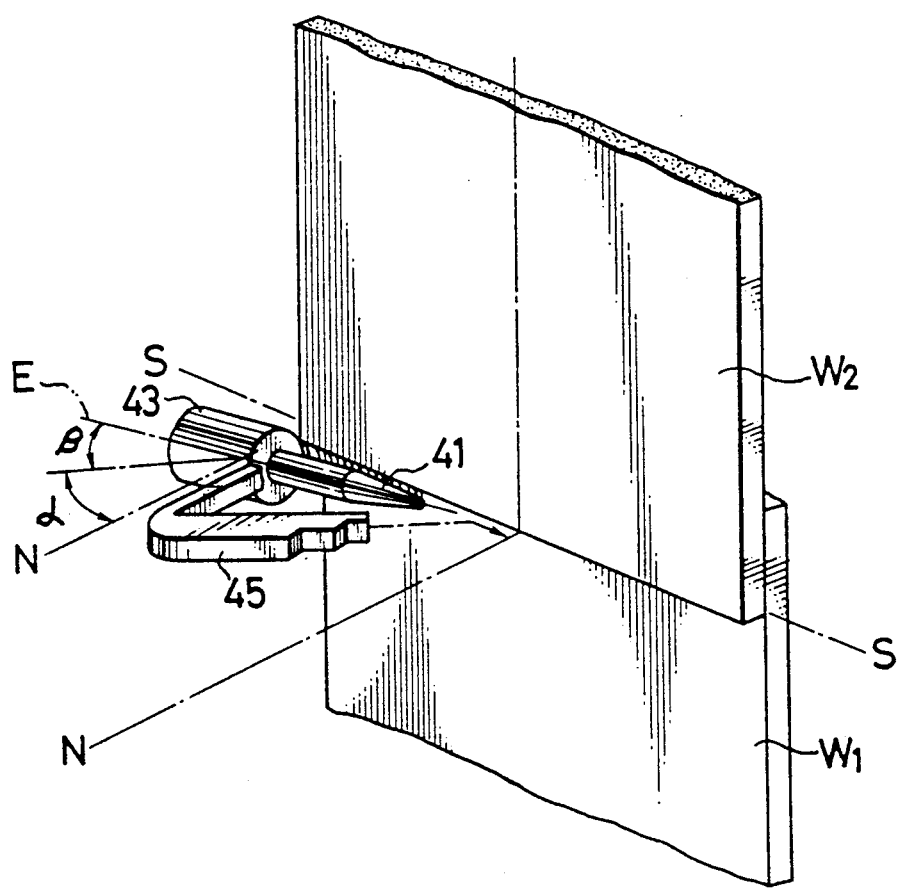
FIG. 4 is a drawing explaining the setting of the direction of the head section with respect to the workpiece.

As a result of this configuration, when, for example, as shown in FIG. 4, a pair of workpiece W1 and W2 are lap-welded along an axis S—S, the axis E of the welding torch 41 can be inclined at an angle alpha with respect to an axis N perpendicular to the surface of the workpiece, by the activation of the fourth manipulator device 35.

In addition, the axis E can be inclined at an angle beta within another plane surface perpendicular to the workpiece, by the activation of the fifth manipulator device 39.

Further, the laser-type visual sensor 45 can be rotated around the axis E and be positioned in a suitable position by the activation of the sixth manipulator device 49.

Again referring to FIG. 1 and FIG. 2, in this embodiment of the welding robot 1 a support block 51 is positioned adjacent to the base frame 1 and a support frame 53 is mounted on the support block 51 to support the workpiece W.

As a result of the above configuration, the first horizontal arm 11 and the second horizontal arm 17 can be rotated around the vertical axes A and B respectively to a suitable angle, and the column-shaped arm 23 can be caused to ascend or descend by a suitable distance, at the signal from the control device 9; and thereby it is possible to freely move the head section 7 provided on the lower edge section of the column-shaped arm 23 in a specified range adjacent to the base frame 3. For example, the tip of the welding torch 41 can be moved in the vertical direction in the range of the area 55 shown in FIG. 1. Also, in the case where the welding torch 41 which is to weld a vertical outside wall, faces inward in the horizontal direction within a horizontal plane, the welding torch 41 can be moved in the range of the area 57 shown in FIG. 2; and in the case where the welding torch 41 which is to weld a horizontal wall, faces downward in the vertical direction, the welding torch 41 can be moved in the range of the area 59 shown in FIG. 2.

Accordingly, by means of this embodiment of the welding robot 1 of the present invention, the desired welding operation can be carried out for a workpiece positioned inside the area 55, and positioned inside the area 57 or the area 59.

Next, a control system 61 for the welding robot will be explained with reference to FIG. 5 and FIG. 6. The control system 61 controls the driving conditions for the manipulator devices 13, 19, 27, 35, 39 and 49, and welding conditions (voltage and current condition) for the welding torch 41, and the like on receiving a signal from the laser-type visual sensor 45.

Figure 5:
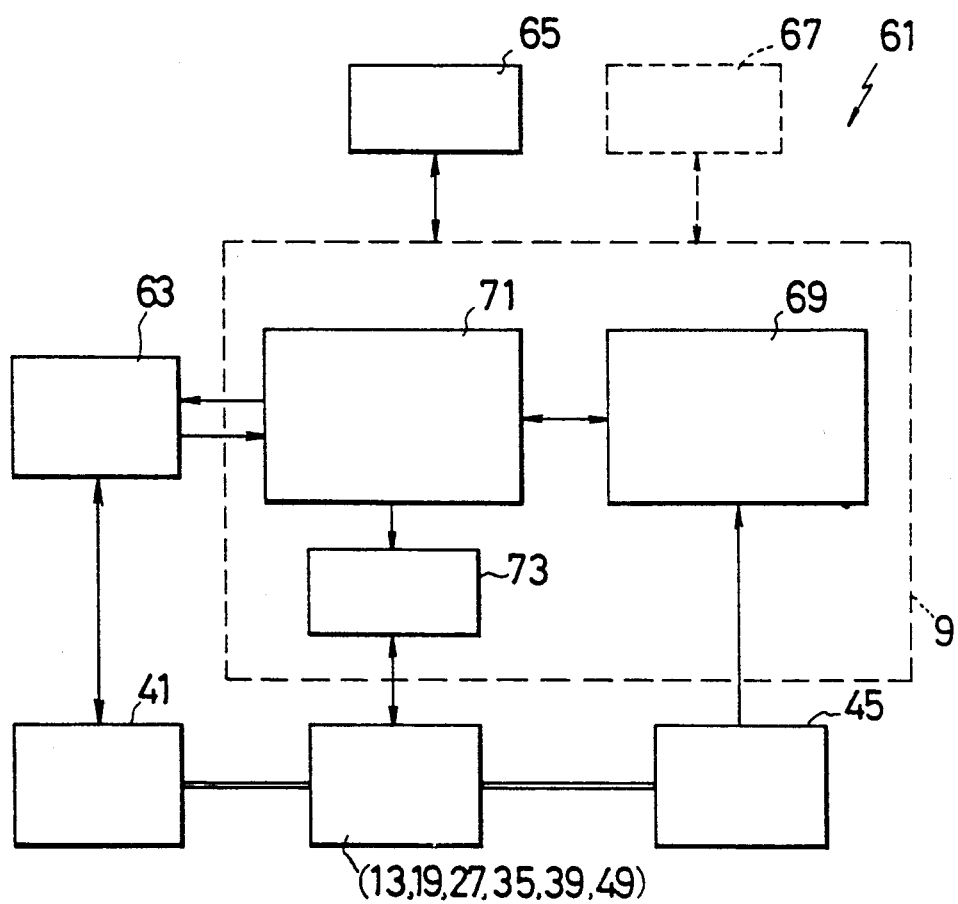
FIG. 5 is a block diagram of the control system of the first embodiment.
Figure 6:
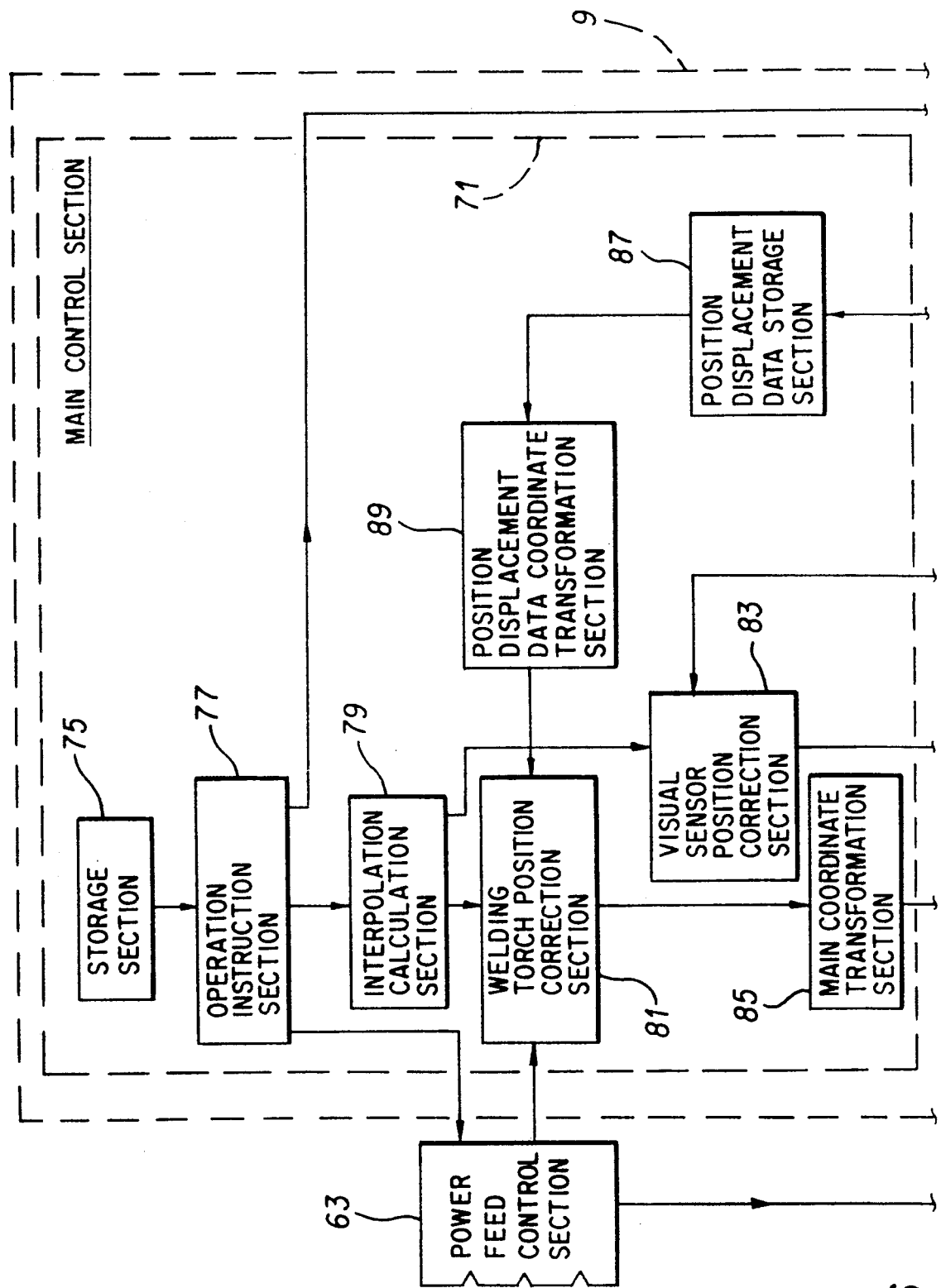
FIG. 6 is a detailed explanatory drawing for the block diagram of FIG. 5.
Figure 6:
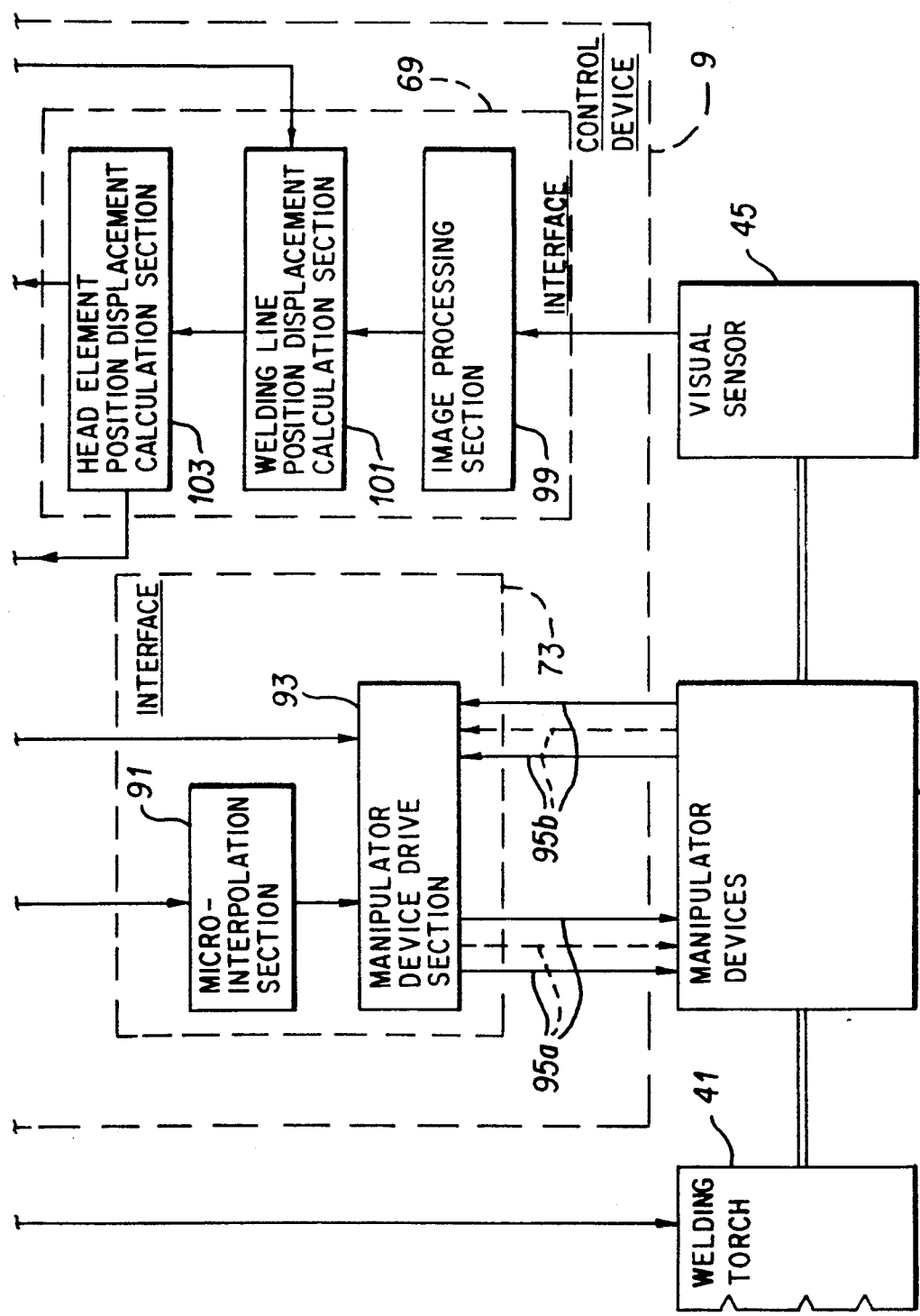

Now referring to FIG. 5, the control system 61 comprises the control device 9, a power feed control section 63, and an external programming device 65 or an external interface 67.

Specifically, in the control device 9, there are provided an interface 69 used for a visual sensor for handling image signals from the laser-type visual sensor 45, a main control section 71 which can store a basic drive program for the manipulator devices 13, 19, 27, 35, 39 and 49, and communicate with the interface 69 for the visual sensor to modify the basic drive program, and an interface 73 for the manipulator device which receives a signal from the main control section 71 and perform the feedback control of the manipulator devices 13, 19, 27, 35, 39 and 49.

Accordingly, by means of this control system, the manipulator devices 13, 19, 27, 35, 39, 49 are controlled by the image signal from the laser-type visual sensor 45 via the interface 73 for the manipulator devices, the main control section 71, and the interface 69 for the visual sensor.

In addition, the power feed control section 63 is bi-directionally connected to the main control section 71. Accordingly, the welding conditions of the welding torch 41 are suitably controlled by means of the program data from the main control section 71. Also, the manipulator devices 13, 19, 27, 35, 39, 49 are suitably controlled in accordance with the feed power conditions from the power feed control section 63 through the medium of the main control section 71 and the interface 73 for the manipulator devices.

The external programming device 65 connected to the control device 9 is a device such as a CAD unit which can prepare many types of basic programs for the welding robot 1. The external interface 67 is for communication with a CIM system, which draws up the programs and the like. Accordingly, the basic drive program for the manipulator devices 13, 19, 27, 35, 39, 49, for example, can be input to the main control section 71 and the like for the control device 9 from any of the abovementioned devices 65 and 67.

The configuration of the control system 9 will now be explained in further detail with reference to FIG. 6.

The main control section 71 comprises a main storage section 75, an operation instruction section 77, an interpolation calculation section 79, a welding torch position correction section 81, a visual sensor position correction section 83, a main coordinate transformation section 85, a position displacement data storage section 87, and a position displacement data coordinate transformation section 89.

The main storage section 75 stores various types of necessary parameters for the welding operation, such as, for example, a welding condition parameter (electric current or electric voltage for welding torch), position setting parameter and moving speed parameter for the manipulator devices, welding part dimension parameter, and welding configuration parameter.

The operation instruction section 77 performs such actions as, when obtaining a program for the welding operation from the external programming device 65, reading a specific parameter from the main storage section 75 corresponding to the program, sending the read out parameters to the power feed control section 63, interpolation calculation section 79, or interface 69 for the visual sensor in order, corresponding to the type of parameter. Specifically, parameters relating to the welding conditions are sent to the power feed control section 63, and the parameters relating to the manipulator devices 13, 19, . . . 49, and the visual sensor 45 are sent to the interpolation calculation section 79 and to the interface 69 for the visual sensor.

The interpolation calculation section 79 obtains position setting parameters for the manipulator devices 13, 19, . . . 49 and the like from the operation instruction section 77 and performs straight line or circular interpolations on these parameters. Among the parameters subjected to straight line or circular interpolations, the position setting parameters and the like for the manipulator devices 13, 19, . . . 49 are sent to the welding torch position correction section 81, and the position setting parameters for the visual sensor 45 is sent to the visual sensor position correction section 83.

Position displacement data showing the displacement from the specified position for the welding torch 41 during the welding operation is, as will be later explained in detail, input from the interface 69 for the visual sensor to the welding torch position correction section 81 via the position displacement data storage section 87 and the position displacement data coordinate transformation section 89.

Accordingly, the parameter input from the interpolation calculation section 79 is corrected at the welding torch position correction section 81 by means of the welding torch position displacement data which is input from the interface 69 for the visual sensor. For example, in the case where the position setting parameter for the welding torch input from the interpolation calculation section 79 is displaced from the actual welding line, the position setting parameter is corrected so as to agree with the welding line. Accordingly, the position setting parameter for making the welding torch 41 actually agree with the welding line is output from the welding torch position correction section 81.

The position setting parameter for the manipulator devices 13, 19, 27, 35, 39, 49 in turn is changed from the absolute coordinates to the relative coordinates at the main coordinate transformation section 85.

On the other hand, the position displacement data showing the displacement from the specified position for the laser-type visual sensor 45 is input directly from the interface 69 for the visual sensor to the visual sensor position correction section 83. Then, a position setting parameter for the visual sensor 45 from the interpolation calculation section 79, is corrected at the visual sensor position correction section 83 by means of the displacement data for the visual sensor 45. For example, in the case where the position of the visual sensor 45 is displaced from its optimum monitoring position, the position setting parameter is corrected so that the visual sensor is moved to that monitoring position. The corrected parameter is then sent to the interface 73 for the manipulator devices.

Next, the interface 73 for the manipulator devices comprises a micro-interpolation section 91 and manipulator device drive section 93.

The micro-interpolation calculation section 91 does further micro-interpolation calculations on the parameter from the main coordinate transformation section 85 of the main control section 71.

The manipulator device drive section 93 receives the parameter from the micro-interpolation calculation section 91 and the visual sensor position correction section 83 in the main control section 71, and perform feedback control of the position, velocity, and the like of the manipulator devices 13, 19, 27, 35, 39, 49 by means of an instruction signal 95a and a detection signal 95b.

Next, the visual sensor interface 69 is for sending the position displacement data for the welding torch 41 and the laser-type visual sensor 45 to the main control section 71 by processing a signal from the laser-type visual sensor 45. The visual sensor interface 69 comprises an image processing section 99, a welding line position displacement calculation section 101, and a head element position displacement calculation section 103.

The image processing section 99 calculates the actual welding line position coordinates based on an image signal from the laser-type visual sensor 45.

The welding line position displacement calculation section 101 is connected to the image processing section 99 and the operation instruction section 77 in the main control section 71. Thus, the basic welding line from the operation instruction section 77 is compared with the actual welding line from the image processing section 99 and the position displacement of the two lines is calculated, based on the results of this comparison.

The head element position displacement calculation section 103 calculates the position displacement between the actual welding line and the head element of the head section 7, such as the welding torch 41 and the visual sensor 45, based on a signal from the welding line position displacement calculation section 101.

Figure 7:
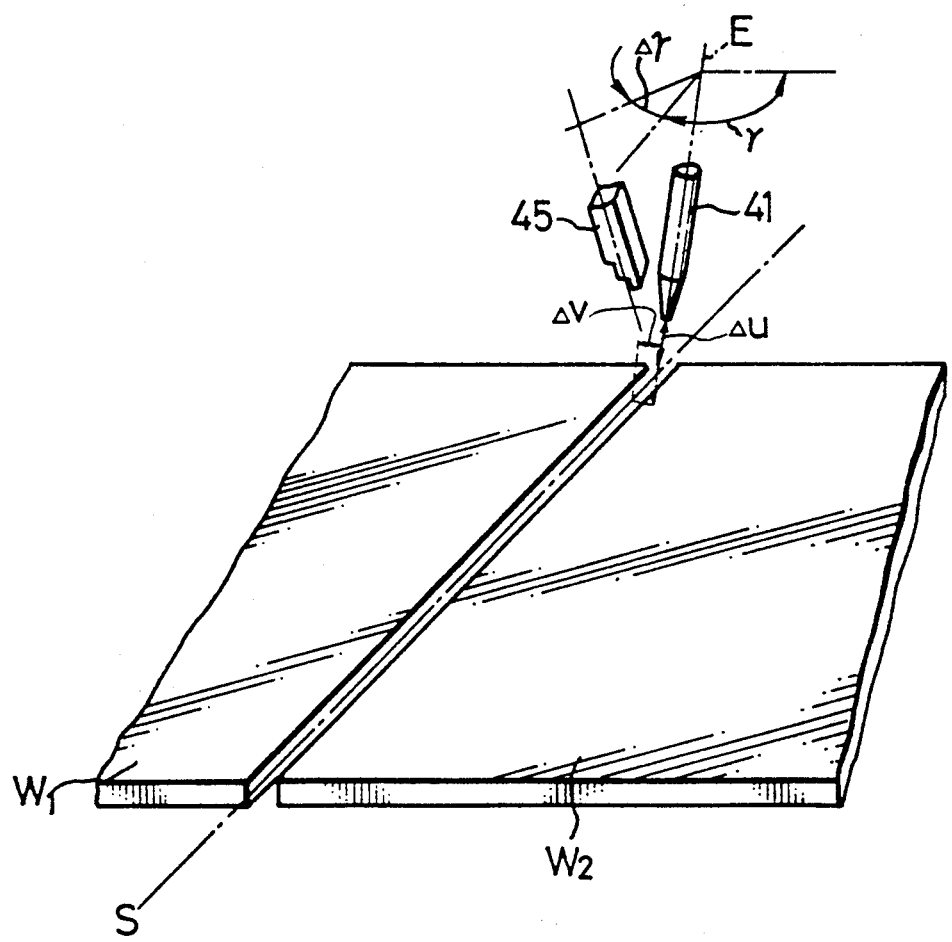
FIG. 7 is a drawing explaining the positional displacement of the welding torch with respect to the welding line.

Specifically, as shown, for example, in FIG. 7, when the workpiece W1 and the workpiece W2 are welded along the axis S—S, the intervals (delta)u, (delta)v between the axis S—S and the tip of the welding torch 41 are calculated; and the displacement angle (delta) (gamma) of the visual sensor 45 with respect to the axis S—S are calculated. Here, (delta)u is the interval between the point of intersection of the extension of the E axis with the workpiece W1 and W2 and the tip of the welding torch. (Delta)v is the interval between the axis S—S and the abovementioned point of intersection measured perpendicular to the axis S—S.

(Delta) (gamma) is the angle of rotation of the visual sensor 45 measured from a plane surface passing through the axis S—S in a rotational surface around the axis E.

Among the positional displacement data (delta)u, (delta)v, and (delta) (gamma), the positional displacement data (delta)u, (delta)v related to the welding torch 41 is stored in the position displacement data storage section 87 of the main control section 71.

The position displacement data storage section 87 comprises a plurality of cells which output suitably stored-data every specified time corresponding to the actual movement of the welding torch 41. Accordingly, after the displacement data (delta)u, (delta)v is once stored in the position displacement data storage section 87 it is transmitted at a specified timing to a position displacement data coordinate transformation section 89.

The position displacement data coordinate transformation section 89 transforms data represented by coordinate values related to the material to be welded, into data represented by the coordinate values related to the head section 7. Accordingly, the position displacement data represented by the coordinate values related to the material to be welded is transformed to position displacement data represented by the coordinate values related to the head section 7, in the position displacement data coordinate transformation section 89, and are input to the welding torch position correction section 81.

Then, in the same manner as previously explained, the position setting parameters for the manipulator devices 13, 19, . . . , 49 are revised from the position displacement data in the welding torch position correction section 81.

On the other hand, the position displacement data (delta) (gamma) relating to the visual sensor 45 is input to the visual sensor position correction section 83 directly from a head element position displacement calculation section 103, for revision of the position setting parameter for the visual sensor 45.

As a result of this configuration, the welding operation program input from the external program device 65 or the external interface 67 is first stored, for example, in the main storage section 75 in the main control section 71.

On initiating the welding process, the specified welding operation parameters based on the input program are transmitted to the manipulator device drive section 93, via the interpolation calculation section 79, the welding torch position correction setion 81, the visual sensor position correction section 83, the main parameter coordinate transformation section 85, and the micro-interpolation calculation section 91. Also, some of the welding condition parameters are directly transmitted to the power feed control section 63 or to the welding line position displacement calculation section 101. Whereupon the manipulator devices 13, 19, ..., 49 are suitably driven by the welding operation parameters, and the desired welding is carried out at the welding torch 41.

The welding operation is monitored by the visual sensor 45. The position displacement data (delta)u, (delta)v, (delta) (gamma) for the welding torch 41 and the visual sensor 45 is calculated in the head element position displacement calculation section 103 via the image handling section 99 and the welding line position displacement calculation section 101.

Within this calculated position displcement data, when the position displacement data (delta)u, (delta)v for the welding torch 41 is input to the welding torch position correction section 81 via the position displacement data storage section 87 of the main control section 71 and the position displacement data coordinate transformation section 89, the welding torch position parameter is corrected in the correction section 81.

In addition, when the position displacement data (delta) (gamma) for the visual sensor 45 is input to the visual sensor position correction section 83, the position parameter for the visual sensor 45 is corrected by means of this position displacement data.

In this way, in this embodiment of the present invention, the welding operation parameters such a the welding torch position parameter and the visual sensor position parameter and the like are always modified and the welding torch is controlled, so that it moves along the actual welding line. Therefore, welding can be performed at a positioning precision of about 1/10 mm.

The laser-type visual sensor 45 is securely mounted on the disc member 43 provided coaxially with the welding torch 41 so that the welding torch 41 can be oriented in many ways with respect to the material being welded and it is possible to move the visual sensor 45 to the optimum position for monitoring the relationship between the welding torch 41 and the welding line, close to the welding position, by suitably rotating the disc member 43.

In addition, because the position parameter of the welding torch 41 is modified by a correction signal from the laser-type visual sensor 45, even when the basic position parameter itself is not that accurate the welding torch 41 can be accurately positioned with respect to the welding line, it becomes possible to perform a precise welding operation; furthermore, because it is not necessary for the basic movement program to be extremely accurate, this program can be drawn up at a desk, rather than at the actual operating site, and CAD or the like can be utilized.

In addition, because the position parameter of the welding torch 41 is modified by a correction signal from the laser-type visual sensor 45, the mechanical precision of the arms 11, 17, 23 and the like is not required to be highly accurate to make highly precise positioning of the welding torch possible. As a result, the manufacturing costs of the arms 11, 17, 23 and the like can be reduced.

The vertical, lateral, and longitudinal movement of the head section 7 is performed by the operation of the first, second, and third menipulator devices 13, 19, 27; the orientation modification of the welding torch 41 is carried out by the operation of the fourth and fifth manipulator devices 35, 39; and the positional modification of the laser-type visual sensor 45 is carried out by the sixth manipulator device 49. Specifically, the movement of each member can be carried out by its own individual manipulator device so that the movement program can be simplified.

Next, another embodiment of the head section 7 will be explained with reference to FIG. 8 and FIG. 9.

Figure 8:
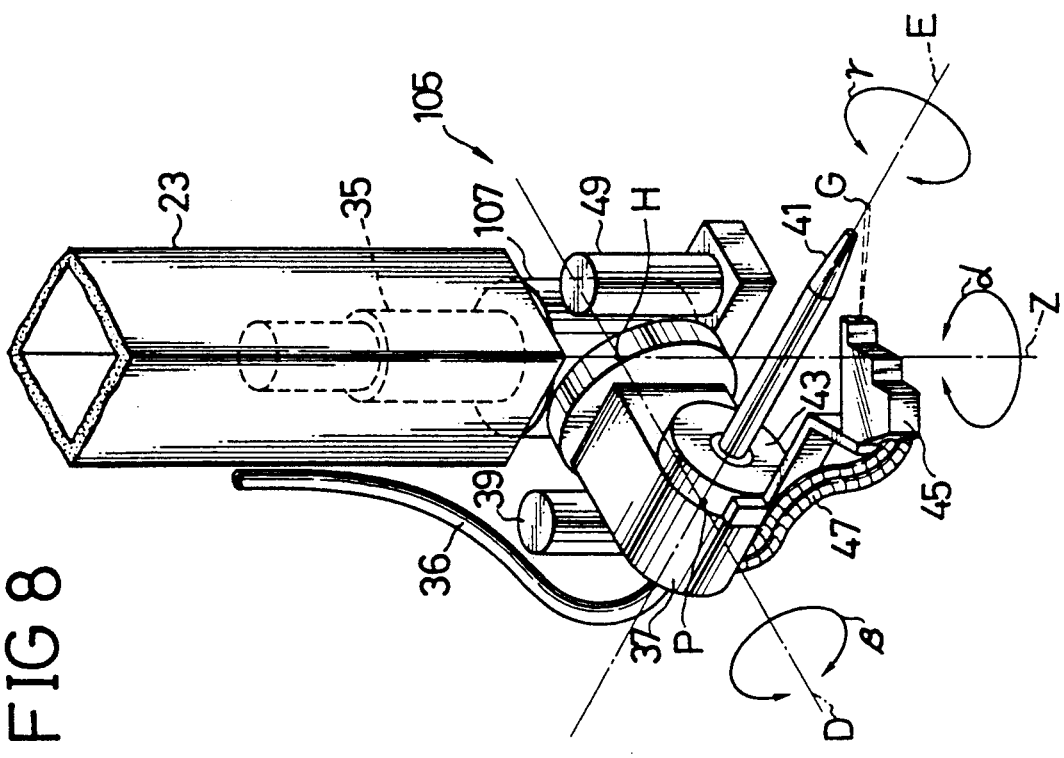

A head section 105 shown in FIG. 8 differs from the previously described embodiment (see FIG. 2) inasmuch as a rotating member 107 supported in a manner freely rotatable around a Z axis on the lower edge section of the column-shaped arm 23 is not in the shape of an inverted L but rather is in the shape of a cylinder. Also, in this embodiment of the present invention, the cylindrical member 107 is positioned coaxially with the column-shaped arm 23.

The previously described rod-shaped block 37 on the cylindrical member 37 projects from the cylindrical member 107 and is supported in a freely rotatable manner arround axis D which is perpendicular to the axis Z. Accordingly, in this embodiment the axis E of the welding torch does not run through the intersection H of the axis D and the axis Z, but rather intersects the axis D at a point P which is offset from the point of the intersection H.

Figure 9:
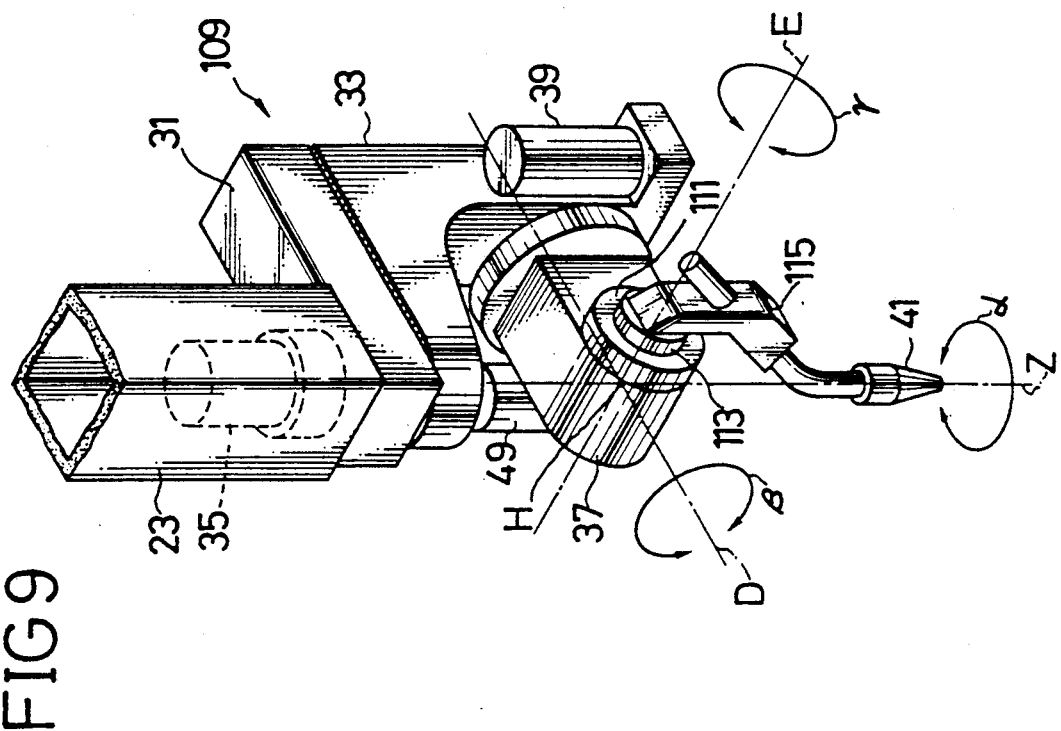
FIG. 8 and FIG. 9 are perspective drawings of another embodiment of the head section of the present invention.

Next, as shown in FIG. 9, the differences in another head section 109 from the embodiment shown in FIG. 2 are as follows.

(1) The welding torch 41 does not directly penetrate the rod-shaped block 37, but rather, a first coaxial member 111 and a second coaxial member 113 are provided on the block 37, and a horn member 115 is provided extending in the direction perpendicular to the axis E. The welding torch 41 is penetratingly supported in the horn member 115. (In the status shown in FIG. 9, the tip of the welding torch 41 is coaxial with the axis Z of the column-shaped arm 23).

(2) The laser-type visual sensor 45 is not provided.

Accordingly, in this embodiment, the tip section of the welding torch 41 can rotate around the shaft E. The head section 7 such as shown in this embodiment of the present invention is good for the type of welding robot which uses welding material.

In the embodiments of the head section 105, 109, some of the rotary shafts mutually intersect at right angles. Acordingly, mutually independent programs are possible for part of the direction positioning of the members such as the welding torchs and the visual sensors and the like used in these heads, and the programs can be simplified.

Figure 10:
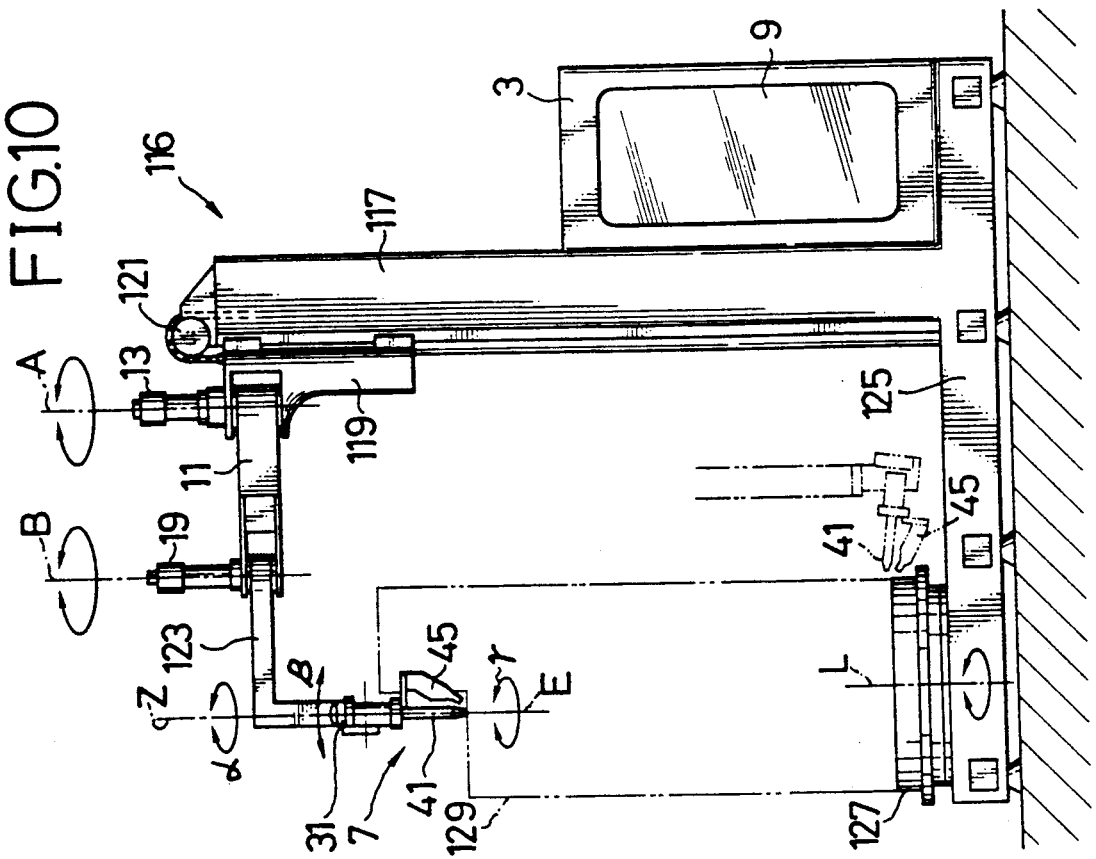
FIG. 10 is a side elevation as an explanatory drawing of a second embodiment of the welding robot of the present invention.

Next, a second embodiment of the welding robot of the present invention will be explained with reference to FIG. 10 and FIG. 11.

This second embodiment 116 of the present invention differs from the first embodiment of the present invention (shown in FIG. 1 and FIG. 2) in the points outlined below.

(1) Instead of the first horizontal arm 11 being supported directly on the base frame 3, in this embodiment 116 a guide column 117 is erected immediately adjacent to the base frame 3. An elevation member 119 is supported in a freely elevatable manner on the guide column 117. The first horizontal arm 11, which is identical to that of the first embodiment, is provided on the elevation member 119 through the first manipulator device 13. A seventh manipulator device 121 is mounted on the guide column 117 for elevating the elevation member 119.

(2) An L-shaped arm 123 of which the tip hangs downward is supported on the horizontal arm 11 through the second manipulator device 19 in a manner which allows it to rotate freely in the horizontal direction. The head section 7, which is identical to that of the first embodiment, is mounted on the tip of the L-shaped arm 123.

(3) A support frame 127 which is freely rotatable around the axis L (for example, within a 90 deg range) is supported on a support block 125 provided integrally on the base frame 3.

The amount of elevation of the elevation member 119 can be increased by elngating the guide column 117 of the second embodiment of the present invention. Accordingly, the welding range 129 in the vertical direction can be made very large, as is clearly shown in FIG. 10.

Figure 11:
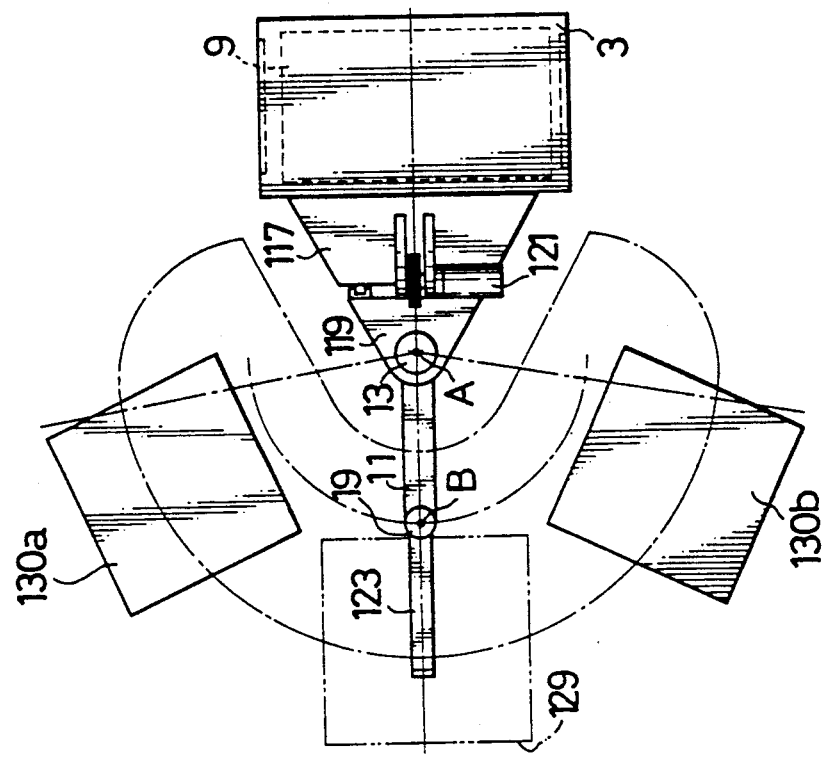
FIG. 11 is a plan drawing as an explanatory drawing of the second embodiment.

As shown in FIG. 11, the workpiece 130a, 130b, which are set over a wide range of area can easily be moved within the access range 129 of the arms 11, 123 by causing the support frame 127 to rotate. Accordingly, the workpiece can be moved in and out when the actual welding is taking place, with no effect on the welding time for the material.

Figure 12:
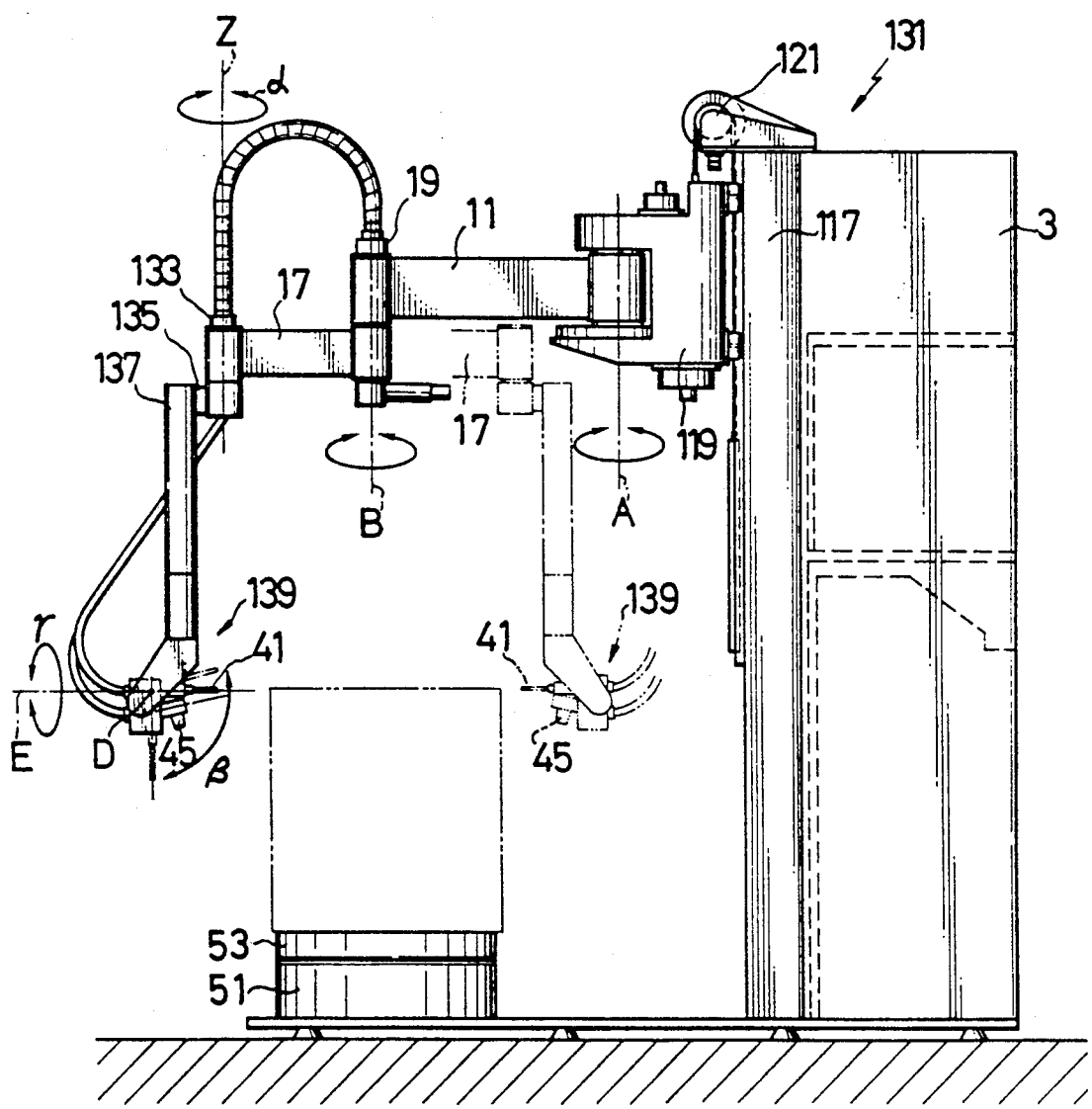
FIG. 12 is a side elevation as an explanatory drawing of a third embodiment of the present invention.

Next, a third embodiment of the welding robot of the present invention will be explained with reference to FIG. 12.

This third embodiment 131 of the present invention differs from the second embodiment 116 of the present inention in the points outlined below.

(1) The base edge section of the second horizontal arm 17 is supported on the tip section of the first horizontal arm 11 in a manner freely rotatable around the axis B at different heights.

(2) an L-shaped arm 137 with an extremely short horizontal extension section 135 is provided in a manner freely rotatable around the axis Z on the tip of the second horizontal arm 17 through an eighth manipulator device 133.

(3) A head section 139 is provided in a manner freely rotatable around two axes only, specifically, the axis D and the axis E.

In this embodiment of the present invention by rotating L-shaped arm 137 around the axis Z by the eighth manipulator device 133, the orientation of the welding torch 41 can be changed within a horizontal plane without changing the position of the head section 139 in the longitudinal, lateral, and vertical directions. In addition, in the present invention the second horizontal arm 17 can freely rotate around the axis B over a 360 deg range.

Accordingly, by the third embodiment of the present invention it is possible to expand the horizontal access range of the arm section without spoiling the function of the head section, which is performed by the second embodiment.

Figure 13:
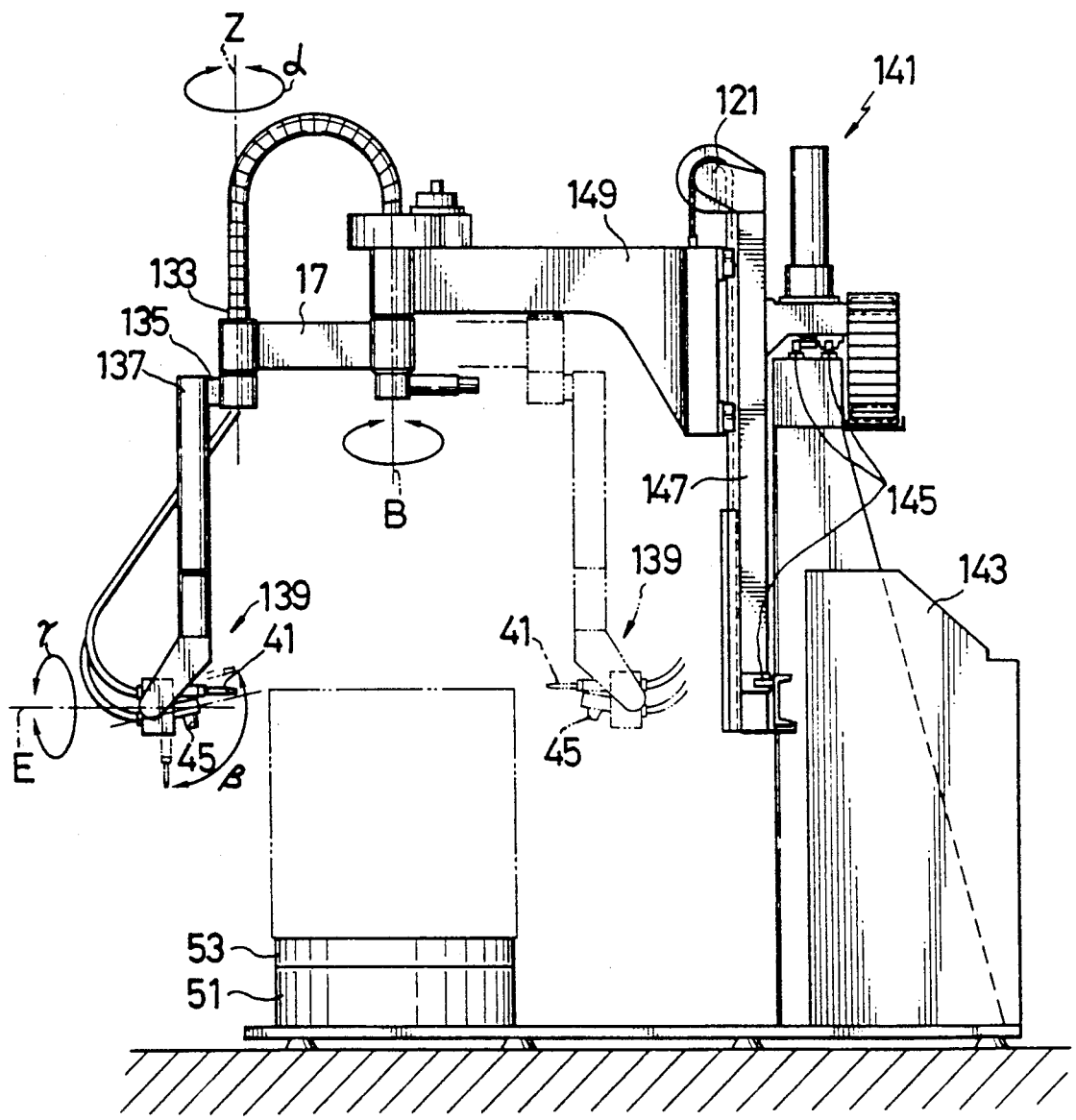
FIG. 13 is a side elevation as an explanatory drawing of a fourth embodiment of the present invention.

Next, a fourth embodiment 141 of the welding robot of the present invention will be explained with reference to FIG. 13. This fourth embodiment 141 differs from the third embodiment 131 in the following manner. Specifically, a base frame 143 is provided with a large dimension in the longitudinal direction. (This is the dimension perpendicular to the surface of the paper—a plan view has been omitted from the drawings). A guide 145 is provided extending in the longitudinal direction on the base frame 143. A slide member 147 which is freely movable in the longitudinal direction is provided on the guide 145. A first horizontal arm 149 which is freely movable in the vertical direction is provided on the slide member 147. Also, a suitable manipulator device (omitted from the drawing) is provided on the baser frame 143 to cause the slide member 147 to move in the longitudinal direction.

Accordingly, it is possible to provide an extremely large access range for the arm in the longitudinal direction by means of the fourth embodiment of the present invention.

As a welding means for use with the welding robot 1, electric welding is ideal, but the robot may easily be adapted for plasma welding, laser welding, and gas welding.

As explained above, by means of the present invention, a welding torch is provided on the welding robot in a manner freely rotatable around at least one axis on the tip of an arm means which is freely movable within a specified area with respect to the base frame. A detection means is provided on the tip of the arm means and is capable of detecting the relative position of the welding torch with respect to the welding line. Because the driving of the welding torch can be controlled by a signal from the detection means, the welding torch can easily be positioned relative to the welding line, and the preparation of the program for controlling the drive of the welding torch can be simplified.

In addition, in the welding robot of the present invention, the welding torch or the device for detecting the welding torch is provided in a manner freely rotatable around at least two mutually intersecting axes, so that the mutual rotation of the welding torch or the detection device around the two axes can be independently controlled. As a result, the control program can be simplified.

Also, a program to ensure accurate robot operation can easily be prepared at a location other than the site of the actual operation.

Although the invention has been described in its preferred embodiments, it is to be understood that various changes and modifications may be made within the purview of the appended claims without departing from the true scope and spirit of the invention in its broader aspects.

What is claimed is:

1. A welding robot for performing welding in a workpiece, comprising:
   a base frame;
   an arm means mounted on the base frame and provided with a tip section which is freely movable within a specified area in relation to the base frame;
   a welding torch provided in a freely rotatable manner around at least one axis on the tip section of the arm means;
   a detection means provided on the tip section of the arm means, for detecting the relative position of the welding torch with respect to the workpiece, the detection means being provided on the tip section so as to be rotatable about the axis of the welding torch; and
   a control means capable of controlling the movement of the arm means with respect to the base frame and of controlling the rotation of the welding torch with respect to the tip section of the arm means and the rotation of the detection means about the welding torch, said control means including means for comparing the detected position of said welding torch with a desired position preprogrammable independent of prior robot movement.

2. The welding robot of claim 1, further comprising a freely rotatable member which is mounted on the tip section of the arm means, and rotatable around a specified axis on the tip section of the arm means, and wherein the welding torch is mounted on the tip section of the arm means through the rotatable member so as to be rotatable around the one axis on the tip section of the arm means.

3. The welding robot of claim 2, wherein the detection means is also mounted on the rotatable member on which the welding torch is mounted.

4. The welding robot of claim 3, further comprising another freely rotatable member which is mounted on the tip section of the arm means, and rotatable around another axis extending in a direction at right angles to the first specified axis, and wherein the rotatable member are mounted on the tip section of the arm means through the another rotatable member.

5. The welding robot of claim 4, wherein the specified axis and the another axis intersect.

6. The welding robot of claim 5, wherein the arm means comprises:
- a first horizontal arm of which the base edge section is supported in a freely rotatable manner on the base frame;
- a second horizontal arm of which the base edge section is supported in a freely rotatable manner on the first horizontal arm; and
- an elevating arm which is supported in a freely elevatable manner on the tip section of the second horizontal arm.

7. The welding robot of claim 5, wherein the arm means comprises:
- an elevating member provided in a freely elevatable manner on the base frame;
- a horizontal arm of which a base edge section is supported in a freely rotatable manner on the elevating member; and
- an arm in the shape of an inverted L of which a base edge section is supported in a freely rotatable manner on the first horizontal arm, and the tip section of which is suspended in the downward direction to support the welding torch and the detection means.

8. The welding robot of claim 3, wherein the arm means comprises:
- an elevating member provided in a freely elevatable manner on the base frame;
- a first horizontal arm of which the base edge section is supported in a freely rotatable manner on the elevating member;
- a second horizontal arm of which the base edge section is supported in a freely rotatable manner on the first arm;
- an arm in the shape of an inverted L with a short horizontal section, of which a base edge section is supported in a freely rotatable manner on the tip section of the second horizontal arm and the tip section of which is suspended in the downward direction to support the welding torch and the detection means.

9. The welding robot of claim 3, wherein the arm means comprises:
- a slide means mounted on the base frame in a freely slidable manner in a specified horizontal direction;
- a first horizontal arm which is supported in a freely elevatable manner on the slide means, projecting therefrom;
- a second horizontal arm of which the base edge section is supported in a freely rotatable manner on the first horizontal arm; and
- an arm in the shape of an inverted L of which a base edge section is supported in a freely rotatable manner on the tip section of the second horizontal arm and the tip section is suspended in the downward direction to support the welding torch and the detection means.

10. The welding robot of claim 1, further comprising transfer means provided to move the workpiece to and from the access range of the tip section of the arm means.

11. The welding robot of claim 1, wherein said control means comprises memory means for storing information from an external programming means.

12. The welding robot of claim 1, further comprising power feed control means for controlling welding condition of the welding torch based on the information about the welding condition, which is supplied from said control means for driving the manipulator devices, said power feed control means supplying the information about the actual welding condition to the control means for driving the manipulator devices.

13. A welding robot comprising:
- a base frame;
- an arm means mounted on the base frame and provided with a tip section which is freely movable within a specified area in relation to the base frame;
- a welding torch provided on the tip section of the arm means in a freely rotatable manner about at least three axes which mutually intersect at the same point in space; and
- a control means capable of controlling the movement of the arm means with respect to the base frame and of controlling the rotation of the welding torch with respect to the tip section of the arm means.

14. The welding robot of claim 13, wherein the longitudinal axis of the welding torch intersect either one of the two rotation axes of the welding torch, at a point which is different from the intersection point of the two rotation axes.

15. A welding robot for performing welding in a workpiece comprising:
- a base frame;
- an elevating member provided in a freely elevatable manner on the base frame;
- a horizontal arm of which a base edge section is supported in a freely rotatable manner on the elevating member;
- an arm in the shape of an inverted L and of which a base each section is supported in a freely rotatable manner on the horizontal arm, and a tip section of which is suspended in the downward direction;
- a welding torch provided in a freely rotatable manner about at least one axis on the tip section of the inverted L-shaped arm; and
- a control means capable of controlling the movement of the elevating member, the horizontal arm and the inverted L-shaped arm with respect to the base frame, and of controlling the rotation of the welding torch with respect to the tip section of the inverted L-shaped arm.

* * * * *